Patented Nov. 22, 1938

2,137,777

UNITED STATES PATENT OFFICE 2,137,777

LUBRICANT AND METHOD OF LUBRICATION

Bert H. Lincoln and Waldo L. Steiner, Ponca City, Okla., and Alfred Henriksen, deceased, late of Ponca City, Okla., by John W. Wolfe, administrator, de bonis non, Ponca City, Okla., assignors to The Lubri-Zol Development Corporation, Cleveland, Ohio, a corporation of Delaware No Drawing. Application December 21, 1936, Serial No. 116,986

11 Claims. (Cl. 87—9)

Our invention relates to lubricating oils and more particularly to improved methods for the production of high quality lubricating oils and such products as new compositions of matter.

This application is a continuation in part of our co-pending application, Serial No. 726,312, filed May 18, 1934, and Serial No. 733,862, filed July 5, 1934.

Engines are being designed for higher pressures on rubbing surfaces, and it is well known that mineral lubricating oils are deficient in extreme pressure characteristics. With greater pressures at rubbing surfaces now being employed, the very best quality hydrocarbon lubricants will break down and allow metal-to-metal contact with subsequent seizure and failure of the rubbing surfaces. This condition of lubrication is referred to as boundary lubrication conditions and may be obtained when engines are operating at heavy loads, low speeds, or if for any reason the supply of lubricant is cut off or not sufficient. This last condition may exist when for mechanical reasons the lubricant pump is not functioning properly or when the lubricant feed line is clogged with foreign matter.

One object of our invention is to provide a lubricant of low coefficient of friction and one which will act as a safety factor in lubrication when abnormal conditions exist for one reason or another. Another object of our invention is to produce a lubricant of high film strength or extreme pressure characteristics which will allow operating engines safely at much higher designed pressures on the rubbing surfaces.

Another object of our invention is to provide a lubricant which will maintain a very low coefficient of friction and high film strength when diluted with light, as well as heavy, hydrocarbon lubricants.

The lubricants of our invention do not drain off rubbing surfaces when they are idle but have a property of maintaining a thin film of lubricant due either to their chemical affinity or chemical-physical polarity. Thus, we have provided a lubricating film on the rubbing surfaces at all times which is of particular value in the starting of engines during cold weather when the lubricant is very viscous and sluggish which tends to extend the time required for delivering the lubricant to the rubbing surfaces for viscous lubrication.

Still another object of our invention is the production of an extreme pressure lubricant which is efficient but not objectionably corrosive or chemically active under conditions of use. This is a very important factor, as it is possible to produce lubricants which will carry very high loads without rupture of the oil film but which are sufficiently active chemically to have a deleterious action upon the metal parts with which they come in contact.

The method which we have discovered and the lubricant prepared thereby for accomplishing the above objects consists broadly of adding one or more halogenated alcohols to mineral hydrocarbon lubricants. We have found that halogenated alcohols in lubricating oil provide lubricants of low coefficient of friction, high film strength, and which are not corrosive or chemically active to an objectionable degree.

In practicing our invention only small quantities, relatively speaking, of the various halogenated alcohols are added to hydrocarbon lubricants. The halogenated alcohol is well blended with the hydrocarbons, and the mixture is ready for use as an extreme-pressure low-coefficient of friction character lubricant.

In demonstrating the efficiency and property of the lubricants prepared by our invention, we use a Timken film testing machine which was designed and has been described by the Timken Roller Bearing Company. The testing machine may be operated under well-controlled conditions and at varying loads. The engine is so designed that the load may be imposed upon a rotating ring pressured against a standard block. By the use of weights and a loading arm, increasing pressures may be used until a point is reached where the pressure is sufficient to rupture the lubricating film and allow seizure of the ring and block. All conditions are held constant throughout the test with the exception of load. It is possible by means of this test to take any two lubricants and determine the load carrying capacity of each for comparative purposes.

In our test work we have used very high quality S. A. E. 30 and S. A. E. 40 classification hydrocarbon lubricants. To demonstrate the high quality of the lubricant, we determined the film strength of the S. A. E. 40 and found it to be 8,000 pounds per square inch.

The following examples will serve to clarify the nature of our invention, but it is to be understood that our invention is not limited to the examples given.

Example No. 1

One per cent (1%) of alphachlorhydrin added to the above described S. A. E. 40 lubricant and tested on the Timken machine gave a film strength of 21,000 pounds per square inch. It was obvious during the operation of the Timken machine with this lubricant that the torque or coefficient of friction was lower than with the mineral oil. Upon examination of the ring and block after completing the test, no signs of excessive chemical activity could be noticed.

Example No. 2

A sample of commercially pure octadecyl alcohol was chlorinated by direct chlorination until it contained sufficient chlorine to represent the dichlor product, and this material was air-blown to remove excessive chlorine and then given a slight alkali sulfite wash to remove any labile and/or free chlorine and/or free hydrogen chloride existing in the product. One per cent (1%) of this material was added to an S. A. E. 30 mineral oil lubricant of very high quality which had a film strength of 6,000 pounds when tested on the Timken machine. The blend of S. A. E. 30 and octadecyl alcohol containing two atoms of chlorine gave a Timken film strength of 24,750 pounds per square inch. During the test of the last mentioned lubricant on the Timken machine a very low coefficient of friction was indicated by low torque and no visible sign of excessive chemical activity could be noted at the end of the test.

Example No. 3

A sample of commercially pure stearic acid was reduced to the corresponding alcohol by the usual laboratory method and the resulting material chlorinated by direct chlorination until the product contained sufficient chlorine to represent the dichlor product. After removing the undesirable impurities by air-blowing, water-washing and a light stabilizing treatment with sodium sulfite, this material was added to a good quality hydrocarbon lubricant of S. A. E. 30 classification and tested on the Timken machine. The S. A. E. 30 lubricant used in this test was of the same quality as that used in Example No. 2 above. The lubricant after the addition of the chlorinated reduced acid gave a Timken film strength of approximately 25,000 pounds per square inch and showed very constant low coefficient of friction and no excessive chemical action.

Example No. 4

High molecular weight petroleum hydrocarbons, such as petroleum wax, may be oxidized by any of the many well-known methods, and the alcohols resulting from such oxidation separated and halogenated for use in this invention. It is also possible to separate the acid formed by oxidation of petroleum hydrocarbon waxes and the like and reduce these to alcohols by any of the well-known methods of reducing such material. Alcohols produced from the oxidation and/or oxidation-reduction of hydrocarbons when halogenated until they contain from about 5 to 50% of chlorine by weight may be very successfully used in our invention. Using commercially pure products we have improved the film strength of hydrocarbon lubricants by as much as 200 to 300 per cent by the addition of one per cent of the halogenated alcohol oxidation products of petroleum hydrocarbons.

Example No. 5

Alcohols resulting from the hydrolysis of high molecular weight esters found in animal and vegetable material upon halogenation have been found to be very satisfactory for use in our invention. For example, the high molecular weight alcohols from the hydrolysis of beeswax, carnauba wax, spermaceti, and the like upon chlorination are quite satisfactory for use within this invention. The high molecular weight acids resulting from the hydrolysis of these naturally occurring materials may be reduced to alcohols by any of the well-known means and halogenated for use in our invention.

Example No. 6

Olein alcohol resulting from the reduction of oleic acid by the well-known means upon halogenation has been found satisfactory for improving the film strength of good quality hydrocarbon lubricants and is quite satisfactory for use in our invention.

Example No. 7

Commercially pure myricyl alcohol was chlorinated until it contained sufficient chlorine to be dichlor miricyl-alcohol. One per cent by volume of this product, after satisfactory purification, was blended with the S. A. E. 30 lubricant previously mentioned and gave a Timken film strength of 24,500 pounds per square inch. No signs of corrosive chemical activity were noted during or after the Timken test on the block or ring.

Example No. 8

The aromatic alcohols, such as benzyl alcohol, ortho, meta and para tolyl carbinol, and their substitution products, after halogenation, are satisfactory in our invention. The halogen may be attached to the benzene ring or attached to the side chain.

The halogenated aromatic alcohols are often preferred, largely due to their effectiveness combined with unusual stability. These properties render them particularly desirable for use in lubricants for internal combustion engines.

To mention some of the other alcohols which are considered satisfactory for our invention after halogenation, we list the following:

Halogenated propyl alcohols
Halogenated butyl alcohols
Halogenated amyl alcohols
Halogenated hexyl alcohols
Halogenated phenyl propyl alcohols
Halogenated phenyl ethyl alcohols Other alcohols, on up through alcohols of as high as 50 carbon atoms are perfectly satisfactory. Alcohols such as secondary butyl alcohol, isobutyl alcohol, and tertiary butyl alcohol, and the other isomeric alcohols of carbon atoms ranging from 3 to 50 carbon atoms or above are satisfactory after halogenation for use in our invention. Some of the other alcohols which are mentioned, normal hexyl alcohol, pinacolyl alcohol, normal heptyl alcohol, cetyl alcohol, ceryl alcohol containing 26 carbon atoms, melissyl alcohol containing 30 carbon atoms, and the various isomeric alcohols of these and the intermediate ones of the homologous series after halogenation are quite satisfactory for use in our invention. The unsaturated aliphatic alcohols, such as vinyl alcohol, allyl alcohol and other aliphatic unsaturated alcohols containing from 3 to 50 carbon atoms or more and their isomeric compounds are satisfactory for use in our invention after halogenation.

Most of the previously mentioned alcohols have been of the monohydric type, but it is to be understood that our invention includes dihydric, trihydric, and poly-hydroxy alcohols containing from 3 to 50 carbon atoms or more after halogenation.

The amount of halogen to be added to the mono, di, tri, or poly hydroxy alcohols may be varied over wide limits, depending upon the type of alcohol being used. The halogen content may very between 5% and 50% or more by weight and be satisfactory for use in our invention. The mono, di, and tri halohydrins may be used.

This invention does not contemplate covering any particular method of halogenating alcohols, as any of the well-known methods have been found satisfactory.

Various means of purifying the halogenated alcohol may be employed, such as water-washing, air-blowing, alkali-washing, alkali-oxidizing-reducing solution washing, passing through active charcoal, distillation under reduced pressure, steaming, and the like, and combinations of two or more of these means may be employed in purifying the product prior to the addition of the material to lubricating oils.

The examples given have been limited to the chlorine containing halogenated alcohols, but it is to be understood that the other members of the halogen family are considered within the ambit of our invention. Fluoride is expensive and highly active chemically, and iodine and bromine are as a rule considered too expensive but may be used in our invention. Chlorine is readily available at reasonable prices and is satisfactory as a halogen for use in our invention.

When using poorer quality original hydrocarbon lubricants larger quantities of halogenated alcohols may be required to obtain the desired results. With any given hydrocarbon lubricant, one skilled in the art of preparing the lubricants can easily determine the percentage of halogenated alcohol required to give the necessary film strength properties, low coefficient of friction properties, et cetera. In most cases the quantity will vary between .1% and 15% by volume. In order that the viscosity of the finished lubricant may not be too greatly diminished, amounts up to 20% by weight, based on the amount of lubricating oil, of the addition agent are contemplated by this invention and generally not more than 10% will be required. Quantities as low as about .1% often give noticeable improvement and about 3% is usually highly satisfactory.

Our invention is not limited to the addition of halogenated alcohols to lubricants of S. A. E. 30 and S. A. E. 40 classification, as our materials may be added to lubricants of all types regardless of classification. Our materials are efficient for use with synthetic lubricating oils, hydrogenated lubricating oils, solvent extracted lubricating oils, and lubricants of all other types and classes.

As, in general, the addition agent will volatilize the more easily the lower its vapor pressure, this invention contemplates the use of halogenated alcohols having vapor pressures less than atmospheric at 140° and preferably at 170° C.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is therefore to be understood that our invention is not to be limited to the specific details shown and described.

Halogenation and chlorination as used herein is meant to include any means or process of obtaining alcohols which contain halogen or chlorine in the molecule. It is also to be noted that in the case of the halogen-bearing aromatic alcohols halogen may be attached to either an alkyl or aromatic group or both.

Other modes of applying the principle of our invention, may be employed instead of the one explained, change being made as regards the materials employed in carrying out the process, provided the ingredient or ingredients stated in any of the following claims or the equivalent of such stated ingredient or ingredients be employed.

We, therefore, particularly point out and distinctly claim as our invention:

1. A lubricating oil comprising in combination a hydrocarbon oil and a small amount of halogenated aliphatic alcohol.

2. A lubricating oil comprising in combination a hydrocarbon oil and a small amount of a chlorinated aliphatic alcohol.

3. A lubricating oil comprising in combination a hydrocarbon oil and a small amount of a substance having the formula, X.OH in which X represents a chlorinated aliphatic nucleus.

4. A lubricating oil comprising in combination a hydrocarbon oil and from about 0.1% to 20% by weight, based on the amount of oil of a halogenated aliphatic alcohol having a vapor pressure less than atmospheric at 140° C.

5. A lubricating oil comprising in combination a hydrocarbon oil and from about 0.1% to 20% by weight, based on the amount of oil of a chlorinated aliphatic alcohol having a vapor pressure less than atmospheric at 140° C.

6. A lubricating oil comprising in combination a hydrocarbon oil and from about 0.1% to 20% by weight, based on the amount of oil of a substance having the formula, X.OH in which X represents a chlorinated aliphatic nucleus, having a vapor pressure less than atmospheric at 140° C.

7. A lubricating oil comprising in combination a lubricating oil base and from about 0.1% to 3% by weight based on the amount of oil base, of a halogen-bearing aliphatic alcohol having a vapor pressure less than atmospheric at 140° C.

8. A lubricating oil comprising in combination a lubricating oil base and from about 0.1% to 3% by weight based on the amount of oil base, of a chlorine-bearing aliphatic alcohol having a vapor pressure less than atmospheric at 170° C.

9. A lubricating composition comprising a major proportion of a hydrocarbon oil and a minor proportion of a halogen-bearing aliphatic alcohol which alcohol, before halogenation, is of the type produced by the reduction of a high molecular weight fatty acid.

10. A lubricating composition comprising a major proportion of a hydrocarbon oil and a minor proportion of a halogen-bearing aliphatic alcohol which alcohol, before halogenation, is of the type produced by hydrolysis of a high molecular weight ester found in animal and vegetable oils and waxes.

11. A lubricating composition comprising a major proportion of a hydrocarbon oil and a minor proportion of halogenated octadecyl alcohol.

BERT H. LINCOLN.
WALDO L. STEINER.
ALFRED HENRIKSEN.
JOHN W. WOLFE,
Administrator, de bonis non, of the Estate of Alfred Henriksen, Deceased.

CERTIFICATE OF CORRECTION.

Patent No. 2,137,777.                           November 22, 1938.

BERT H. LINCOLN, ET AL.

It is hereby certified that error appears in the printed specification of the above numbered patent requiring correction as follows: Page 3, first column, line 21, for "very" read vary; page 3, first column, line 41, for "Fluoride" read Fluorine; and that the said Letters Patent should be read with this correction therein that the same may conform to the record of the case in the Patent Office.

Signed and sealed this 20th day of December, A. D. 1938.

Henry Van Arsdale (Seal)                                  Acting Commissioner of Patents.

major proportion of a hydrocarbon oil and a minor proportion of a halogen-bearing aliphatic alcohol which alcohol, before halogenation, is of the type produced by hydrolysis of a high molecular weight ester found in animal and vegetable oils and waxes.

11. A lubricating composition comprising a major proportion of a hydrocarbon oil and a minor proportion of halogenated octadecyl alcohol.

BERT H. LINCOLN.
WALDO L. STEINER.
ALFRED HENRIKSEN.
JOHN W. WOLFE,
Administrator, de bonis non, of the Estate of Alfred Henriksen, Deceased.

CERTIFICATE OF CORRECTION.

Patent No. 2,137,777.   November 22, 1938.

BERT H. LINCOLN, ET AL.

It is hereby certified that error appears in the printed specification of the above numbered patent requiring correction as follows: Page 3, first column, line 21, for "very" read vary; page 3, first column, line 41, for "Fluoride" read Fluorine; and that the said Letters Patent should be read with this correction therein that the same may conform to the record of the case in the Patent Office.

Signed and sealed this 20th day of December, A. D. 1938.

Henry Van Arsdale (Seal)   Acting Commissioner of Patents.